May 4, 1926. 1,583,517

E. R. BARANY

BATTERY BOX

Original Filed May 25, 1922  3 Sheets-Sheet 1

Inventor
Edmund R. Barany
By his Attorneys
Williams & Pritchard

May 4, 1926.  E. R. BARANY  1,583,517
BATTERY BOX
Original Filed May 25, 1922   3 Sheets-Sheet 2

Inventor
Edmund R. Barany
By his Attorneys
Williams & Pritchard

May 4, 1926.
E. R. BARANY
BATTERY BOX
1,583,517
Original Filed May 25, 1922   3 Sheets-Sheet 3
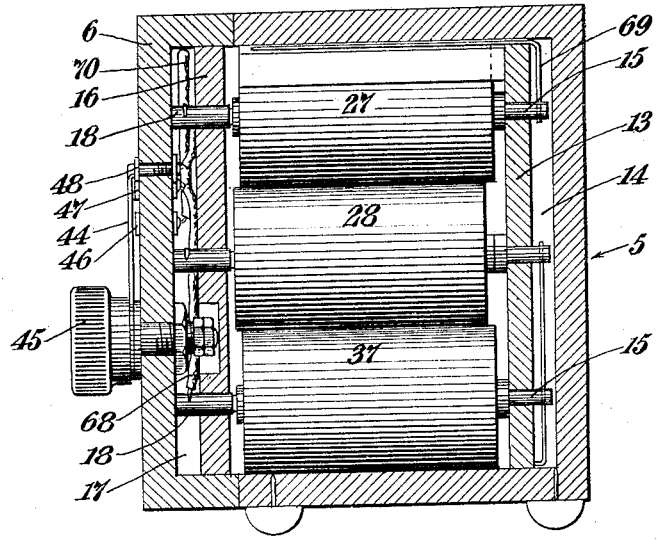
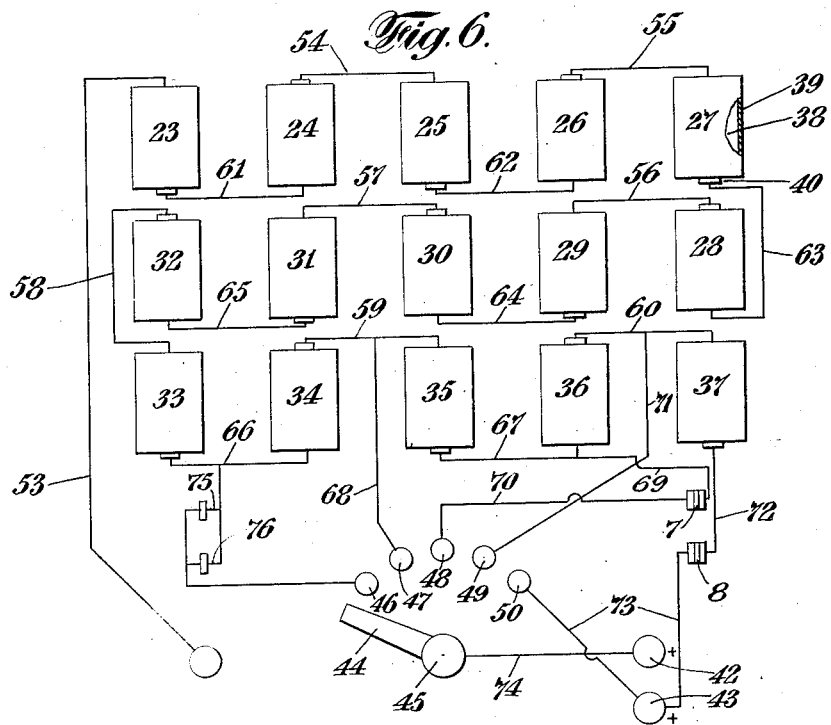
Inventor
Edmund R. Barany
By his Attorneys
Williams & Pritchard Patented May 4, 1926.

1,583,517

UNITED STATES PATENT OFFICE.

EDMUND R. BARANY, OF BROOKLYN, NEW YORK, ASSIGNOR TO YALE ELECTRIC CORPORATION, A CORPORATION OF NEW YORK.

BATTERY BOX.

Application filed May 25, 1922, Serial No. 563,493. Renewed October 17, 1925.

*To all whom it may concern:*

Be it known that I, EDMUND R. BARANY, a citizen of the United States, and resident of the borough of Brooklyn, county of Kings, city and State of New York, have invented certain new and useful Improvements in Battery Boxes, of which the following is a specification.

This invention relates to battery boxes of the type particularly adapted to receive a plurality of cells connected in circuit and has for one of its primary objects the provision of a novel and compact arrangement of the several elements entering into the combination thereof together with a simple and reliable wiring system so cooperating with a suitable controlling means that one or as many of the several cells desired may be cut out of the circuit without affecting or destroying the circuit of the remaining cells.

Other objects and certain advantages of the invention will become apparent from the following description when taken in connection with the accompanying drawings in which:

Figure 5 is a transverse sectional view taken on line 5—5 of Figure 1.

Figure 6 is a diagrammatic view illustrating the several circuits through the apparatus.

Figure 1:
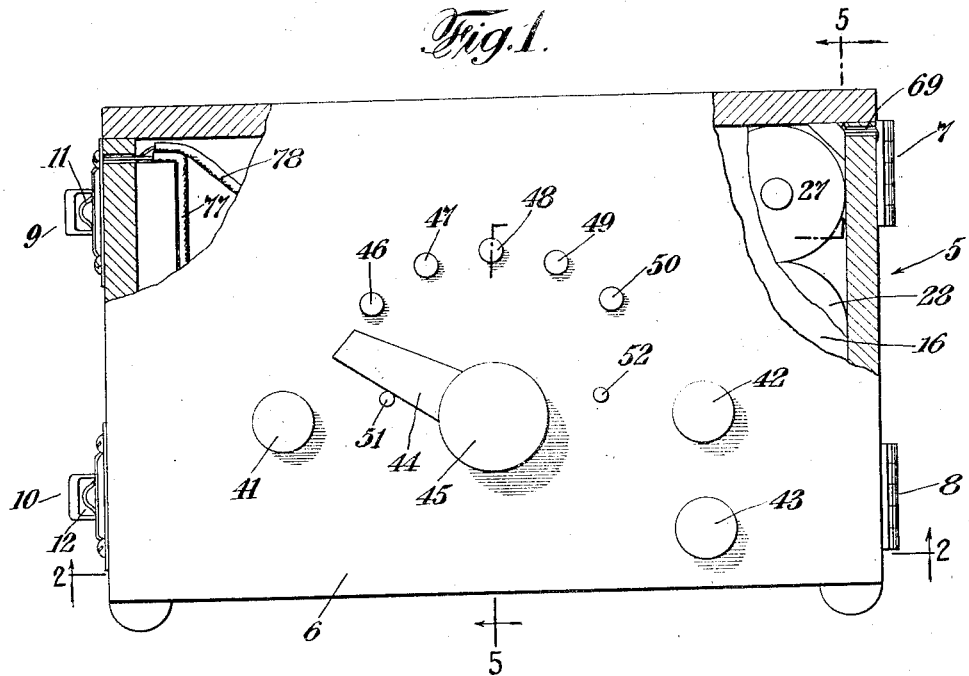
Figure 1 is a front elevation of the device, certain portions thereof being broken away.
Figure 2:
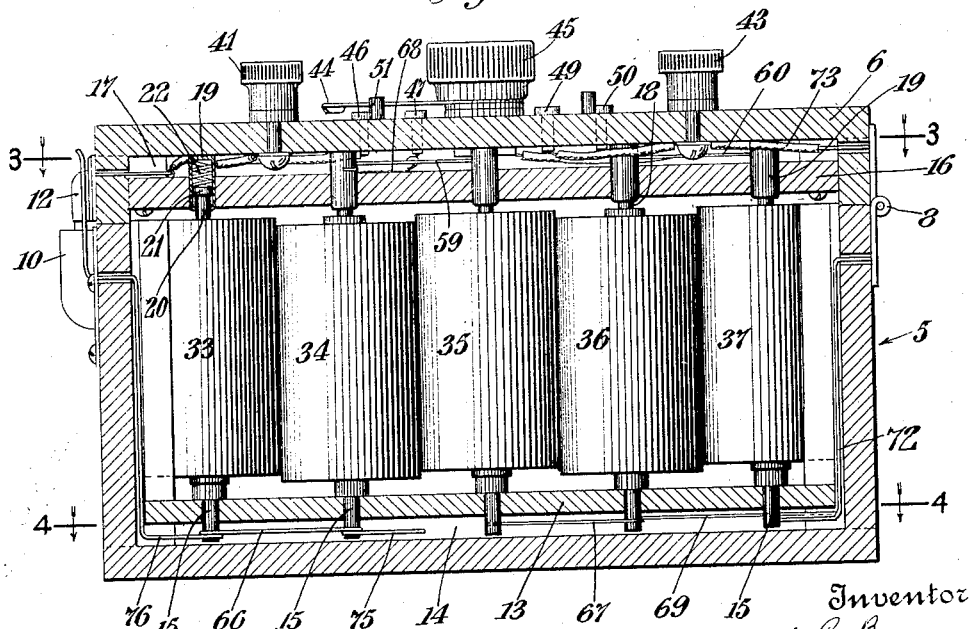
Figure 2 is a horizontal sectional view taken on line 2—2 of Figure 1.

In the drawings, wherein for the purpose of illustration is shown what I at present consider the preferred form of my invention, the numeral 5 indicates a receptacle in the form of a box having a closure 6 connected thereto as by means of hinges 7 and 8, the closure being adapted to be retained in its closed position as shown in Figures 1, 2 and 5 by means of snap fasteners 9 and 10 suitably connected to the box 5 and adapted to cooperate with lugs 11 and 12 carried by the closure 6. The receptacle 5 is provided with a divisional wall 13 which is spaced an appreciable distance from the rear wall of the box to provide a chamber 14 adapted to receive corresponding ends of a plurality of contacts 15 carried by the wall 13. The closure 6 is provided with a similar divisional wall 16 which is spaced an appreciable distance from the front of the closure to provide a chamber 17 into which corresponding ends of a plurality of spring pressed contacts 18 are adapted to project. These spring pressed contacts comprise shells 19 having reciprocating plungers 20 arranged therein which are provided with shoulders 21, the contacts being retained in position by reason of the fact that the shells are upset at their open ends to restrict the same. In order that the plungers 20 may be maintained in intimate engagement alternately with the zinc and carbon electrodes of a plurality of cells hereinafter more particularly referred to, I provide coil springs 22 which are retained within the shells 19 and adapted to exert an end thrust upon the plungers 20.

Within the receptacle or box 5 there is arranged a plurality of cells indicated by the numerals 23, 24, 25, 26, 27, 28, 29, 30, 31, 32, 33, 34, 35, 36 and 37. These cells are of the usual type, each being in the form of a zinc container 38 surrounded by cardboard 39 and provided with a centrally disposed carbon electrode 40.

To the closure 6 there is suitably connected a plurality of binding posts 41, 42 and 43 which are adapted to be connected in circuit with any such instrument as the device embodying my invention is adapted to be used, these binding posts being suitably connected to proper electrodes of certain of the cells hereinabove referred to. As a means for controlling the current which the several cells above mentioned are adapted to furnish, I have provided a circuit closure which is carried by the cover or closure 6. This circuit closure comprises a more or less resilient contact arm 44, the free end of which is adapted to be swung in an arc by means of an operating knob 45 in order to successfully engage a plurality of contacts 46, 47, 48, 49 and 50 which are also carried by the closure 6 and extend an appreciable distance into the chamber 17. In order to limit the throw of the contact arm 44 in either direction, I have provided a pair of stop lugs 51 and 52 which are arranged at opposite sides of the operating knob 45, as clearly shown in Figure 5.

The several cells carried within the receptacle 5 are suitably connected in circuit, and to this end I employ a conductor 53 which is connected to the resilient contact 18 which engages the zinc container of the cell 23, the contact 53 being arranged within the chamber 17 and in turn connected to the binding post 41. Within the chamber 17 there is also provided a plurality of conductors 54, 55, 56, 57, 58, 59 and 60 which are connected to certain of the resilient contacts 18 engaging respectively the carbon and zinc electrodes of the following pairs of cells, namely, 24 25; 26 27; 28 29; 30 31; 32 33; 34 35; 36 37. Within the chamber 14 there is provided a plurality of conductors 61, 62, 63, 64, 65, 66 and 67 which are connected with the contacts 15 which engage the carbon and zinc electrodes respectively of the following pairs of cells, 23 24; 25 26; 27 28; 29 30; 31 32; 33 34; 35 36. To the conductor 59 intermediate the carbon and zinc electrodes of the cells 34 and 35, there is connected a conductor 68 which in turn is connected to the contact 47. To the conductor 67 intermediate the carbon and zinc electrodes of the cells 35 and 36 respectively, there is connected a conductor 69 which leads to one corner of the receptacle 6 within the chamber 14, the conductor in turn being connected to the hinge 7 from which a conductor 70 is led to the contact 48, the latter named conductor being arranged within the chamber 17. To the conductor 60 intermediate the carbon and zinc electrodes of the cells 36 and 37 respectively, there is connected a conductor 71 which is arranged within the chamber 17 and leads directly to the contact 49. To the contact 15 which engages the carbon electrode of the cell 37, there is connected a conductor 72 which leads from within the chamber 14 to the hinge 8, the hinge in turn being connected to the contact 50 by means of a conductor 73 arranged within the chamber 17. It will be noted that the contact 50 is connected directly with the binding post 43, and that any one of the contacts 46 to 50 inclusive is adapted to be electrically connected with the contact 42 through the instrumentality of the resilient arm 44 and a conductor 74 which is connected to the binding post 42 and maintained in suitable electrical communication with the resilient arm 44. To the conductor 66 there is connected a pair of conductors 75 and 76 which lead respectively to the clasps 9 and 10, the lugs 11 and 12 of which are electrically connected to the contact 46 by means of conductors 77 and 78. It will be noted that the connections between the conductor 66 and the contact 46 are such that should only one of the clasps 9 and 10 be locked, electrical communication between the conductor 66 and the contact 46 is nevertheless insured. If on the other hand both of the clasps 9 and 10 are locked and an intimate electrical connection is afforded between the cooperating parts of only one of these clasps, the circuit leading from the conductor 66 to the contact 46 may nevertheless be maintained through the other clasp. The arrangement therefore insures a dependable electrical communication between the conductor 66 and the contact 46 inasmuch as it is highly unlikely that the cooperative elements of the clasps 9 and 10 when locked in position will be so positioned as to prevent electrical communication between the conductor 66 and the contact 46. This double connection is not deemed necessary in the case of the hinges 7 and 8 inasmuch as the nature of the hinge is such that the cooperative elements thereof are so intimately engaged under all conditions as to insure a positive electrical communication between the conductors 69, 70 and 72, 73 respectively.

Figure 3:
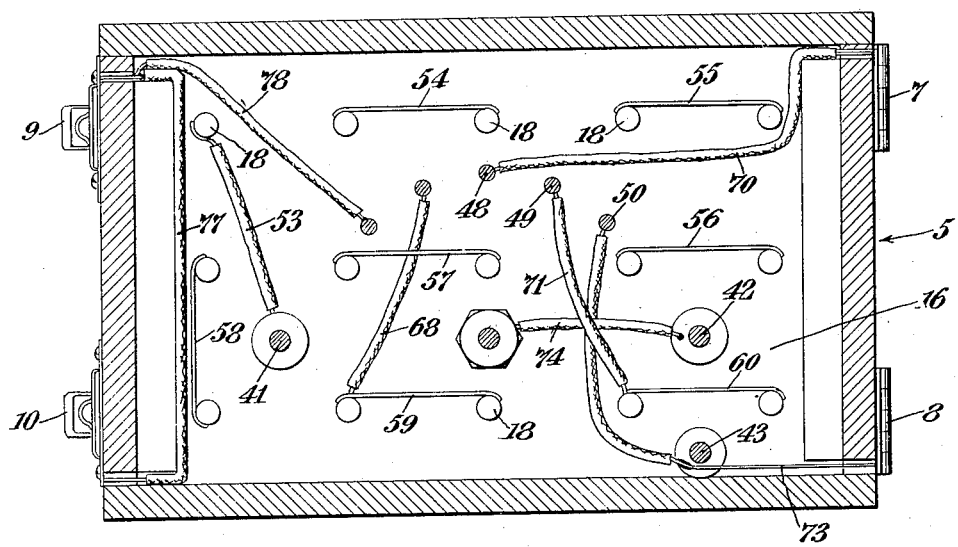
Figure 3 is a horizontal sectional view taken on line 3—3 of Figure 2.
Figure 4:
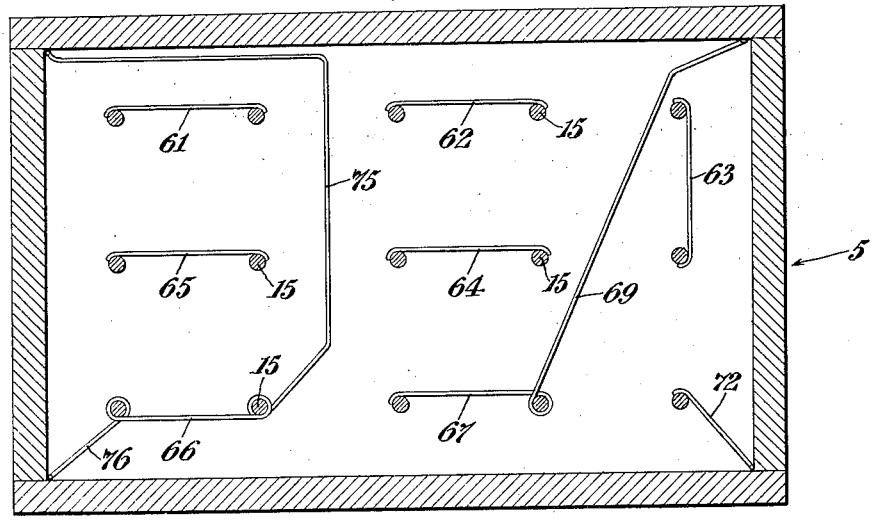
Figure 4 is a horizontal sectional view taken on line 4—4 of Figure 2.

In use the operation of the device embodying my invention is as follows: Assuming that an instrument is electrically connected with the binding posts 41 and 42 and it is desired to control or vary the current supplied to such instrument, the contact arm 44 is moved into engagement with the contact 46 thereby placing eleven of the cells in circuit through the following connectings, namely, the conductors 53, 61, 54, 62, 55, 63, 56, 64, 57, 65, 58, 66, 75, 76, 77, 78, the contact 46 the arm 44 and the conductor 74. If it should be desired to increase the strength of the current thus supplied to the instrument the contact arm 44 is moved into engagement with the contact 47 thereby adding another cell, namely, cell 34 to the circuit, which in this instance may be traced from the cell 33 through the conductor 66, the cell 34, conductors 59 and 68, the contact arm 44 and the conductor 74. By advancing the contact arm 44 so as to engage the contact 48 an additional cell, namely, cell 35 may be placed in circuit, the current being transmitted from cell 34 through cell 35, conductors 67 and 69, the hinge 7, conductor 70, contact arm 44 and conductor 74. Should it be desired to add another cell to the circuit, namely, cell 36, the contact arm 44 is advanced to engage the contact 49 whereupon the current is permitted to travel from conductor 67 through cell 36, conductors 60 and 71, the contact arm 44 and conductor 74. Should it be desired to placed the total number of cells in circuit, the contact arm 44 is moved into engagement with the contact 50 thereby permitting the current to flow from the conductor 60 through cell 37 and conductor 72 to the hinge 8 from which it passes through the conductor 73, arm 44 and the conductor 74. In the event it is desired to maintain a steady current, that is to say, one in which it is impossible to vary the voltage, the instrument or apparatus to which the current is supplied may be connected directly to the contacts 41 and 43 in which instance all of the cells are maintained in circuit regardless of the position of the arm 44 due to the fact that the conductor 73 is electrically connected not only to the contact 50 but also to the binding post 43 as most clearly shown in Figure 3, and diagrammatically illustrated in Figure 6. The apparatus shown in the accompanying drawings is adapted to be placed in series with a similar apparatus or any other suitable source of current, where the full voltage of the device shown in the drawings is desired, by simply connecting the binding post 43 to a suitable terminal of the additional battery or other additional source of energy. If on the other hand it should be desired to connect the device shown in the accompanying drawings in series with another similar device or other source of electrical current and yet be able to govern the output of energy to a certain extent, the terminal 42 rather than the terminal 43 may be connected to a suitable terminal or electrode of the additional battery or other auxiliary source of current.

Having thus described my invention, I claim:

1. A battery box comprising a receptacle adapted to receive a plurality of cells, a closure for said receptacle, a contact support carried by said closure and spaced an appreciable distance from one wall thereof to provide a chamber, a second contact support arranged within said receptacle and spaced an appreciable distance from one wall thereof to provide a second chamber, a pair of terminals associated with said closure, a conductor arranged within the first named chamber, said conductor being connected to one of said terminals and to one of said cells, a second terminal carried by said closure, a circuit controller carried by said closure, and a conductor arranged within the first named chamber and connecting the second named terminal with said controller, and conductors so connecting said cells with said controller that said controller is permitted to function as a means for varying the voltage passing from said cells to the second named terminal.

2. A battery box comprising a receptacle adapted to receive a plurality of cells, a closure for said receptacle, a contact support carried by said closure and spaced an appreciable distance from one wall thereof to provide a chamber, a second contact support arranged within said receptacle and spaced an appreciable distance from one wall thereof to provide a second chamber, a pair of terminals associated with said closure, a conductor arranged within the first named chamber, said conductor being connected to one of said terminals and to one of said cells, a second terminal carried by said closure, a circuit controller carried by said closure, a conductor arranged within the first named chamber and connecting the second named terminal with said controller, conductors so connecting said cells with said controller that said controller is permitted to function as a means for varying the voltage passing from said cells to the second named terminal, and a third terminal carried by said closure, and means so connecting said cells with the third named terminal as to maintain all of said cells in circuit with the first and third named terminals independently of the operation of said controller.

3. A battery box comprising a receptacle, a plurality of cells arranged within said receptacle, a terminal electrically connected with said cells, a second terminal electrically connected with the first named terminal through said cells, a third terminal, and a circuit controller adapted to electrically connect said third terminal with said first terminal through a predetermined number of said cells without disturbing the electrical connection afforded through said cells between said first and second terminals.

4. A battery box comprising a receptacle, a terminal associated with said receptacle, a second terminal associated with said receptacle, a plurality of cells arranged within said receptacle said cells being electrically connected to said terminals and adapted to deliver their full voltage thereto, a third terminal associated with said receptacle and variable means electrically connecting said third terminal with said first terminal through said cells, whereby a predetermined number of cells may be placed in circuit with said first and third terminals without affecting the electrical connection afforded between the first and second terminals through said cells.

In testimony whereof, I have affixed my signature to this specification.

EDMUND R. BARANY.